(12) United States Patent
Tamura (10) Patent No.: US 10,104,304 B2
(45) Date of Patent: Oct. 16, 2018

(54) IMAGING APPARATUS CAPABLE OF PERFORMING INTERMITTENT IMAGE CAPTURING OPERATION, METHOD FOR CONTROLLING THE SAME, AND STORAGE MEDIUM

(71) Applicant: CANON KABUSHIKI KAISHA, Tokyo (JP)

(72) Inventor: Yusuke Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/414,259

(22) Filed: Jan. 24, 2017

(65) Prior Publication Data
US 2017/0214837 A1    Jul. 27, 2017

(30) Foreign Application Priority Data

Jan. 26, 2016 (JP) ................................. 2016-012870

(51) Int. Cl.
*H04N 5/235* (2006.01)
(52) U.S. Cl.
CPC ......... *H04N 5/2352* (2013.01); *H04N 5/2356* (2013.01); *H04N 5/2351* (2013.01)
(58) Field of Classification Search
CPC ... H04N 5/2352; H04N 5/2351; H04N 5/2356
See application file for complete search history.

(56) References Cited

U.S. PATENT DOCUMENTS

2014/0176789 A1*   6/2014  Kubota .............. H04N 5/23219
                                                          348/362

FOREIGN PATENT DOCUMENTS

JP    2014-235183 A    12/2014

* cited by examiner

*Primary Examiner* — Ahmed A Berhan
(74) *Attorney, Agent, or Firm* — Canon U.S.A., Inc. IP Division (57) ABSTRACT

An imaging apparatus includes a acquisition unit acquires a measurement luminance, an exposure control unit, and a setting unit sets a control luminance to be used for exposure controlling in an image capturing. In an interval shooting mode, if a measurement luminance of a second image capturing to be performed after a first image capturing is in a predetermined range based on, as a reference point, a control luminance of the first image capturing, the setting unit sets a control luminance of the second image capturing to be the same as the control luminance of the first image capturing. If the measurement luminance of the second image capturing is not in the predetermined range, the setting unit sets the control luminance of the second image capturing based on a calculation result by using the measurement luminance of the second image capturing and the control luminance of the first image capturing.

19 Claims, 6 Drawing Sheets

IMAGING APPARATUS CAPABLE OF PERFORMING INTERMITTENT IMAGE CAPTURING OPERATION, METHOD FOR CONTROLLING THE SAME, AND STORAGE MEDIUM

BACKGROUND

Field

The present invention relates to an imaging apparatus capable of performing an intermittent image capturing operation, a method for controlling the imaging apparatus, and a storage medium.

Description of the Related Art

Interval photographing is a conventionally known technique that performs intermittent image capturing operations at predetermined image capturing time intervals. Further, as conventionally known, acquiring a time-lapse moving image in which temporal changes of a subject (that is, imaging target) are compressed is feasible by sequentially connecting a plurality of images acquired by performing intermittent image capturing operations.

As discussed in Japanese Patent Application Laid-Open No. 2014-235183, in a case where the interval photographing includes automatic exposure control processing to be performed in each image capturing operation, if the brightness greatly changes between frames acquired in image capturing operations, a user may feel uncomfortable when continuously viewing frames.

To solve the above-mentioned problem, Japanese Patent Application Laid-Open No. 2014-235183 proposes a technique capable of smoothing an appropriate exposure value determined by the automatic exposure control processing with reference to a history of the appropriate exposure value obtained through the past automatic exposure control processing, in the interval photographing.

SUMMARY OF THE INVENTION

Various embodiments provide an imaging apparatus capable of setting an interval shooting mode for causing an imaging unit to perform intermittent image capturing operations to acquire a moving image constituted by a plurality of images sequentially acquired through the intermittent image capturing operations. The imaging apparatus includes a luminance acquisition unit configured to acquire a real measurement luminance by performing photometry on a subject, an exposure control unit configured to perform exposure control processing, and a luminance setting unit configured to set a control luminance to be used when the exposure control unit performs exposure control processing in an image capturing operation. In the interval shooting mode, if a real measurement luminance acquired in response to a second image capturing operation to be performed after a first image capturing operation is in a predetermined range based on, as a reference point, a control luminance used in the first image capturing operation, the luminance setting unit sets a control luminance to be used in the second image capturing operation to be substantially the same as the control luminance used in the first image capturing operation. Further, if the real measurement luminance acquired in response to the second image capturing operation is not in the predetermined range, the luminance setting unit sets the control luminance to be used in the second image capturing operation based on a calculation result obtainable by using the real measurement luminance acquired in response to the second image capturing operation and the control luminance used in the first image capturing operation.

Further features will become apparent from the following description of exemplary embodiments with reference to the attached drawings.

DESCRIPTION OF THE EMBODIMENTS (Fundamental Configuration of Digital Camera 100)

Figure 1:
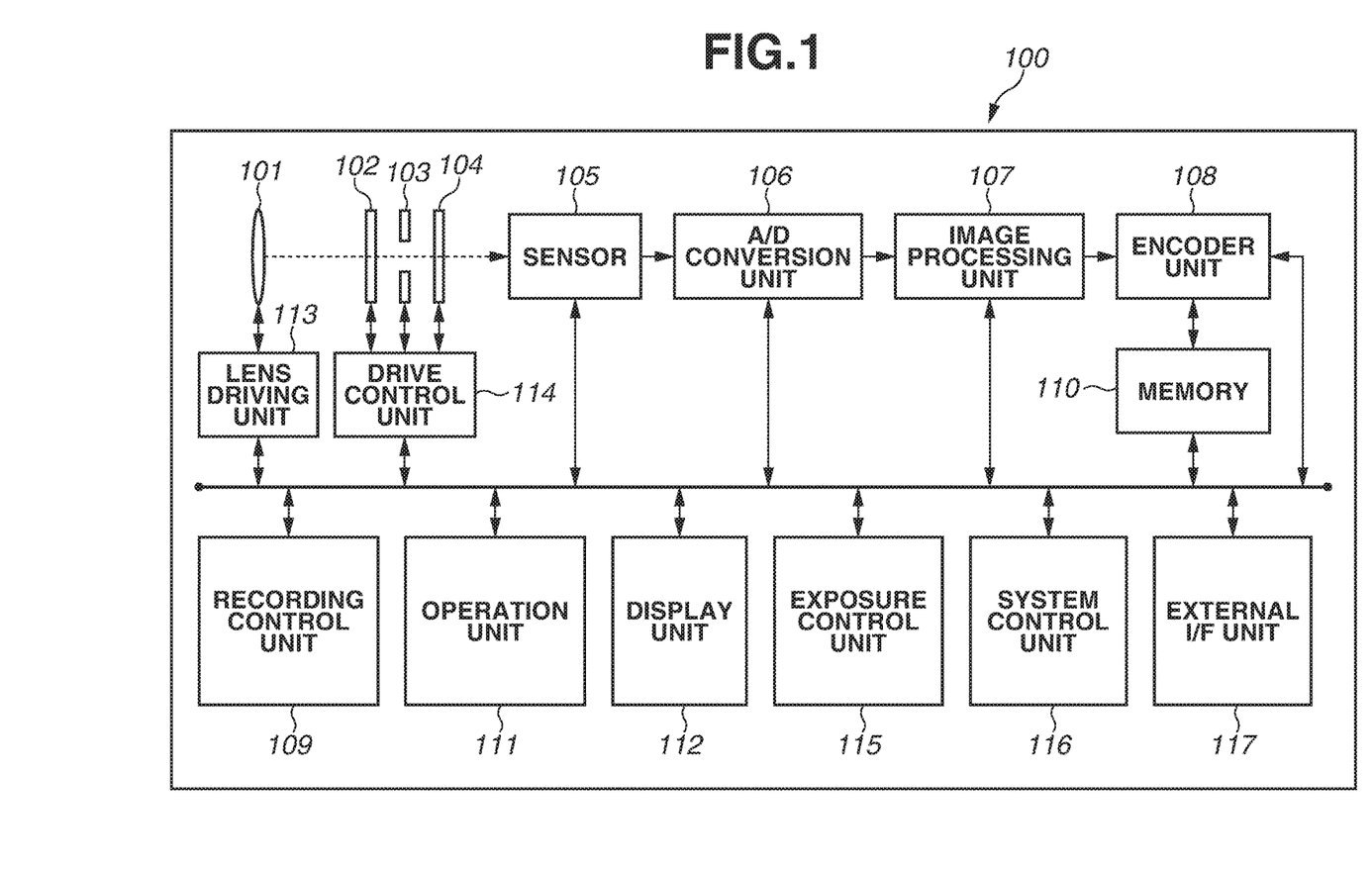
FIG. 1 is a block diagram illustrating an exemplary configuration of a digital camera as an example of an imaging apparatus according to an exemplary embodiment.
Figure 2:
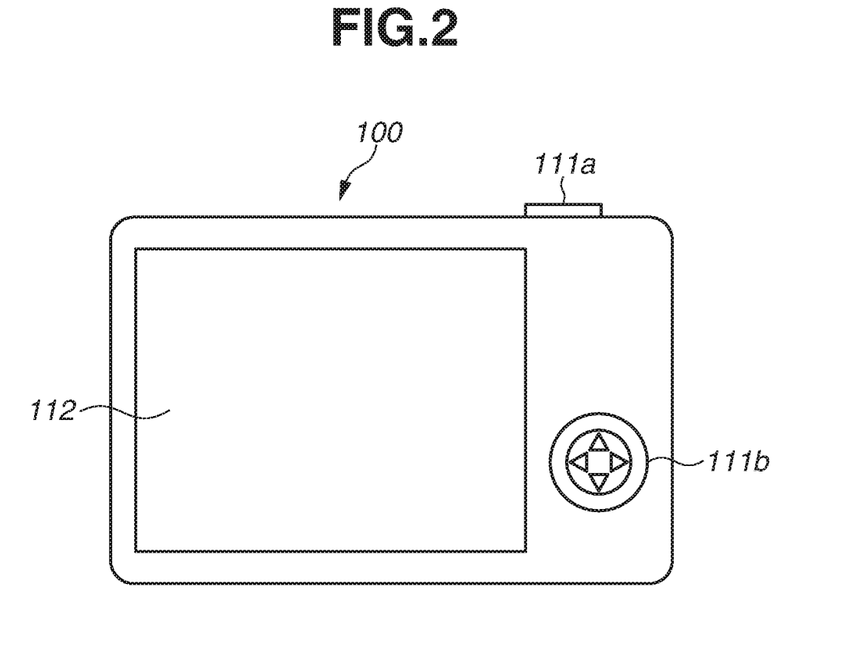
FIG. 2 is a rear view of the digital camera according to an exemplary embodiment.

Hereinafter, preferred embodiments will be described in detail below with reference to attached drawings. FIG. 1 is a block diagram illustrating an exemplary configuration of a digital camera (hereinafter, simply referred to as "camera") 100, which is an exemplary embodiment of an imaging apparatus. FIG. 2 is a rear view of the camera 100 according to an exemplary embodiment.

At least one of the functional blocks illustrated in FIG. 1 can be realized by an application specific integrated circuit (ASIC), a programmable logic array (PLA), or any other hardware device, or can be realized by a central processing unit (CPU), a micro processing unit (MPU), or any other programmable processor, which can execute software programs. Further, an appropriate software/hardware combination is employable to constitute a functional block. Accordingly, the same hardware device is employable to realize different functional blocks described below.

As illustrated in FIG. 1, an imaging lens 101 is an optical component that includes a lens group (e.g., a focus lens, a zoom lens, and a shift lens). The imaging lens 101 can guide a light flux from a subject (imaging target) toward an inner portion of the camera 100. An ND filter 102 is a light-diminishing unit configured to diminish the light having passed through the imaging lens 101. A diaphragm 103 is a light quantity adjustment member that can adjust the quantity of light having passed through the imaging lens 101. A shutter 104 is a shielding member that can shield the light that may enter a sensor 105 described below. The shutter 104 can be positioned at a retracted state where the incoming light can be directly guided to the sensor 105 and a shielding state where the incoming light is shielded.

The sensor 105 is an imaging unit employing a charge accumulation type solid-state image sensor, such as a charge-coupled device (CCD) or a complementary metal oxide semiconductor (CMOS), which can generate analog image data (i.e., an analog image signal) through photoelectric conversion on the light flux from a subject. An A/D conversion unit 106 is a conversion unit configured to perform sampling, gain adjustment, and A/D conversion processing on the analog image data output from the sensor 105 and output digital image data. The A/D conversion unit 106 includes a CDS circuit that can remove noise components from the signal received from the sensor 105 and a nonlinear amplification circuit that can nonlinearly amplify the received signal before it is converted into the digital image data.

An image processing unit 107 is a processing unit configured to perform various processing (e.g., WB adjustment processing and gradation processing) on the digital image data output from the A/D conversion unit 106 and output processed digital image data. In the present exemplary embodiment, the image processing unit 107 converts the digital image data received from the A/D conversion unit 106 into a YUV image signal and outputs the YUV image signal.

An encoder unit 108 is a conversion unit configured to convert a format of acquired image data. For example, the encoder unit 108 converts the format of the image data received from the image processing unit 107 into a recording format. A recording control unit 109 is a control unit configured to control the recording of image data. The recording control unit 109 controls the format conversion of image data performed by the encoder unit 108 based on a recording format having been set beforehand.

A memory 110 is a storage unit, such as an electrically erasable programmable read-only memory (EEPROM), which is represented by a flash memory. The memory 110 includes a RAM region and a ROM region. For example, the memory 110 stores calculation formulas described below and luminance information about appropriate exposure, and various data relating to operations of the camera 100, which are recorded beforehand. Further, the memory 110 can store various data acquired by the camera 100.

An operation unit 111 is an operation unit configured to enable a user to input an operational instruction relating to each operation of the camera 100. The operation unit 111 includes switches and buttons that can be operated by the user. As illustrated in FIG. 2, the operation unit 111 includes a release switch 111a and an operation dial 111b. The operation unit 111 can be configured to include a touch panel serving as a display device, as one of constituent members, which can receive an operation input of a user's touch operation based on detection of electrostatic capacity or pressure. In this case, a display unit 112 described below and the operation unit 111 can be integrated as the touch panel.

The display unit 112 is, for example, constituted by a thin film transistor (TFT) type liquid crystal display (LCD) device, which can display image data. The display unit 112 can display analog image data converted from digital image data by a D/A conversion unit (not illustrated) and can display photographing-assisting and operation-assisting indicators and marks (such as a focus detection region).

A lens driving unit 113 is a drive unit configured to drive the imaging lens 101 according to an instruction from a system control unit 116 described below. A drive control unit 114 is a drive control unit configured to control a driving operation of each of the ND filter 102, the diaphragm 103, and the shutter 104 according to an instruction from an exposure control unit 115 described below.

The exposure control unit 115 is a control unit configured to perform exposure control processing when the sensor 105 acquires image data. The exposure control unit 115 can change the exposure during an image capturing operation based on a photometry result (luminance) acquired by performing photometry on a subject. Parameters relating to the exposure include density (dimming quantity) of the ND filter 102, opening degree (i.e., diaphragm value) of the diaphragm 103, shutter speed relating to charge accumulation time of the sensor 105, and photographic sensitivity relating to analog and digital gain amounts. Accordingly, the exposure control unit 115 performs the exposure control processing in such a way as to realize an appropriate exposure corresponding to the brightness of a subject by comprehensively changing the above-mentioned each parameter according to the brightness of the subject.

The system control unit 116 is a control unit configured to control various operations to be performed by the camera 100. The system control unit 116 includes an interval control CPU. More specifically, the system control unit 116 instructs the lens driving unit 113 and the exposure control unit 115 to perform exposure and focus controls for the camera 100.

An external I/F unit 117 is a connection unit configured to control the connection between the camera 100 and an external device (not illustrated) or an external memory (not illustrated) provided outside the camera 100. Accordingly, for example, the camera 100 can record acquired image data in the external memory via the external I/F unit 117 or can read image data recorded in the external memory. The camera 100 according to the present exemplary embodiment has the above-mentioned fundamental configuration.

(Image Capturing Operation)

A target image capturing operation, which can be performed by the camera 100, will be described in detail below. First, the system control unit 116 detects an operated state of the release switch 111a in a state where electric power is supplied to each portion of the camera 100. Then, the system control unit 116 starts an operation for capturing an image of a target object. First, in the image capturing operation, the shutter 104 provided in front of the sensor 105 retracts from an optical path. A light flux passing through the imaging lens 101 forms an image on the sensor 105. Next, the exposure control unit 115 controls each portion of the camera 100 to operate according to an instruction from the system control unit 116 in such a way as to realize a luminance calculation exposure recorded beforehand in the memory 110.

Next, the system control unit 116 performs image capturing processing and causes the sensor 105 to read stored electric charge and output analog image data. The analog image data is then converted into a YUV image signal via the A/D conversion unit 106 and the image processing unit 107. The system control unit 116 calculates a luminance value (Bv). In the following description, it is assumed that the luminance is expressed in terms of "APEX" value, in which 1 Bv represents brightness corresponding to one stage of "APEX" value.

An exemplary luminance calculation method will be described below. The exposure control unit (i.e., a luminance acquisition unit) 115 acquires the luminance of a subject (imaging target) corresponding to the image data acquired by the sensor 105. More specifically, the exposure control unit 115 divides the acquired image data into a plurality of blocks and calculates an average luminance of each block. Then, the system control unit 116 acquires a representative luminance by integrating average luminance values of respective blocks. The representative luminance obtained through the above-mentioned processing is the luminance actually measured based on the acquired image data and can be used in the exposure control for the target image capturing operation. If the image-capturing mode presently set is a time-lapse mode (interval shooting mode) described below, the above-mentioned luminance is real measurement luminance (i.e., first luminance) BvReal.

The method for calculating the representative luminance (i.e., the real measurement luminance) is not limited to the example described above. For example, another employable calculation method includes calculating an arithmetic mean of the average luminance of each block or calculating a weighted average by weighting the average luminance of each block. Any other method is employable as the representative luminance (i.e., the real measurement luminance) acquisition method, if the employed method is capable of acquiring the luminance of each of a plurality of blocks divided from the acquired image data, at least considering the brightness of the entire image.

According to the above-mentioned configuration according to the present exemplary embodiment, the signal employed for acquiring the luminance is the image data acquired by the sensor 105. As another exemplary embodiment, a photometry sensor (not illustrated) provided in addition to the sensor 105 is usable to acquire the luminance Bv.

Next, the exposure control unit 115 performs exposure control processing based on the acquired luminance. More specifically, the exposure control unit 115 sets an appropriate exposure by changing the exposure according to a luminance difference ΔBv between the acquired luminance Bv and a target luminance corresponding to the appropriate exposure recorded beforehand in the memory 110.

Further, the system control unit 116 calculates information about the distance between the camera 100 and the subject (i.e., imaging target distance) and performs AF control processing for changing the position of the focus lens of the imaging lens 101 to an in-focus position based on the calculated imaging target distance. In the present exemplary embodiment, the system control unit 116 performs the AF control processing based on contrast information about the image data acquired while the position of the focus lens of the imaging lens 101 is changed. As another exemplary embodiment, a sensor dedicated to the AF control processing can be provided or a plurality of pixels constituting the sensor 105 can be configured to include at least one pixel dedicated to the phase difference detection to calculate the imaging target distance according to the phase difference detection method. The camera 100 can perform the above-mentioned image-capturing preparation.

If the camera 100 completes the image-capturing preparation, the system control unit 116 performs image capturing processing and acquires analog image data. Digital image data acquired by performing the above-mentioned various processing on the analog image data is converted by the recording control unit 109 via the encoder unit 108 to have a recording format and then recorded in the memory 110. Further, the system control unit 116 controls the display unit 112 to display analog image data to be displayed, which has been converted from the digital image data by the D/A conversion unit (not illustrated). The camera 100 can perform the above-mentioned fundamental image capturing operation.

As described above, the camera 100 is configured to continuously perform sequential operations, including image-capturing preparation and image data recording/display, in response to a user's operation on the release switch 111a. As another exemplary embodiment, the camera 100 can be configured to perform the image-capturing preparation when the release switch 111a is in a SW1 state (e.g., a partly pressed state) and perform the actual image capturing operation when the release switch 111a is in a SW2 state (e.g., a fully pressed state).

(Image-Capturing Mode)

Hereinafter, various image-capturing modes that can be set by the camera 100 will be described in detail below. The image-capturing modes of the camera 100 according to the present exemplary embodiment include ordinary still image mode, ordinary moving image mode, and time-lapse mode. When the image-capturing mode is the ordinary still image mode, the camera 100 acquires a piece of image data (i.e., a still image) for recording. When the image-capturing mode is the ordinary moving image mode, the camera 100 acquires a moving image by sequentially connecting a plurality of image data acquired by the sensor 105. When the image-capturing mode is the time-lapse mode, the camera 100 performs intermittent image capturing operations to acquire a time-lapse moving image by sequentially connecting a plurality of image data acquired by performing the intermittent image capturing operations.

The ordinary moving image mode and the time-lapse mode are different from each other in the number of times the sensor 105 accumulates electric charge within a predetermined time (or the number of times the accumulated charge is reset). According to the camera 100 according to the present exemplary embodiment, the number of times the sensor 105 accumulates electric charge within a predetermined time in the time-lapse mode is smaller than that in the ordinary moving image mode. According to the above-mentioned configuration, in the ordinary moving image mode, the total image capturing time required to acquire one moving image is substantially identical to the reproduction time of the acquired moving image. On the other hand, in the time-lapse mode, the reproduction time of the moving image is shorter than the total image capturing time required to acquire one moving image. Accordingly, it is feasible to perform recording and reproduction processing by compressing a temporal change of a subject in a time-lapse moving image (i.e., a moving image acquired in the above-mentioned time-lapse mode).

In the above-mentioned time-lapse mode, a user can select an arbitrary image capturing interval (i.e., time interval) from predetermined image capturing intervals (e.g., one second, 30 seconds, one minute, 15 minutes, 30 minutes, one hour, three hours, five hours, 10 hours, and 24 hours) having been set beforehand. The camera 100 can be configured to enable a user to freely set an arbitrary image capturing interval (e.g., an image capturing interval shorter than one second).

Further, in the above-mentioned time-lapse mode, it is feasible to set the total image capturing time or the total number of image capturing operations in performing the intermittent image capturing operations. In the following description of the time-lapse mode, it is assumed that a user can set the total image capturing time. The camera 100 according to the present exemplary embodiment can perform intermittent image capturing operations without any restriction, without setting the total image capturing time or the total number of image capturing operations, as long as a battery (not illustrated) provided in the camera 100 can continuously supply electric power. A user can freely set the above-mentioned each image-capturing mode by operating the operation unit 111.

(Time-Lapse Mode)

Figure 3:
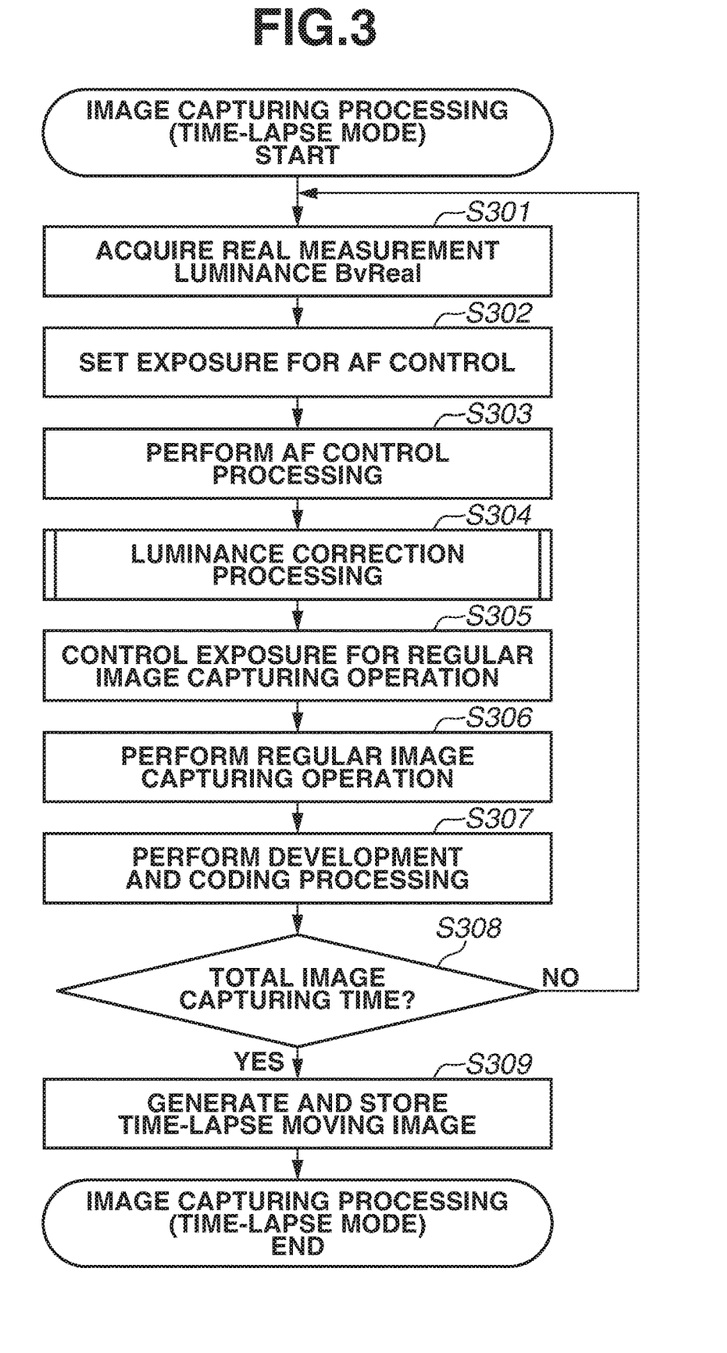
FIG. 3 is a flowchart illustrating image capturing processing in a time-lapse mode according to an exemplary embodiment.

Hereinafter, the image capturing processing in the time-lapse mode according to the present exemplary embodiment will be described in detail below with reference to FIG. 3. FIG. 3 is a flowchart illustrating an example of the image capturing processing in the time-lapse mode according to an exemplary embodiment. It is assumed that a user sets the image capturing interval and the total image capturing time beforehand.

As illustrated in FIG. 3, if the user instructs the camera 100 to start an image-capturing operation, then in step S301, the system control unit (i.e., the luminance acquisition unit) 116 acquires the real measurement luminance (i.e., the first luminance) BvReal based on the image data (hereinafter, simply referred to as "image") acquired by the sensor 105.

The camera 100 can be configured to acquire a new image for photometry in response to the intermittent image capturing operation, as an image to be used in the acquisition of the real measurement luminance, immediately before acquiring an image for recording to be used in the generation of a time-lapse moving image. Alternatively, the camera 100 can be configured to use the image for recording acquired in the previous image capturing operation. If the camera 100 is configured to continuously perform first and second image capturing operations and acquire a new image for photometry, the camera 100 acquires the new image within two seconds before starting the second image capturing operation. The new image for photometry can be an image acquired at timing adjacent to the second image capturing operation compared to the midpoint of the image capturing interval between the first image capturing operation and the second image capturing operation continuously performed.

The camera 100 can be configured to change the method for selecting the image to be used in acquiring the real measurement luminance with reference to the image capturing interval between intermittent image capturing operations. For example, if the image capturing interval is relatively short, there will be a lower possibility that the luminance of a subject (imaging target) greatly changes. Therefore, the camera 100 acquires the real measurement luminance based on the previous image for recording. On the other hand, if the image capturing interval is relatively long, there will be a higher possibility that the luminance of a subject greatly changes between image capturing operations. Therefore, the camera 100 acquires a new image for photometry immediately before acquiring an image for recording and acquires the real measurement luminance based on the newly acquired image.

Next, in step S302, the exposure control unit 115 determines an exposure for the AF control based on the real measurement luminance BvReal acquired in step S301. Then, the system control unit 116 controls each portion of the camera 100 and sets the exposure for the AF control. The above-mentioned exposure for the focus detection is desired to be a value having been set in such a way as to realize a depth of field as shallow as possible (i.e., a diaphragm value adjacent to the open side) with reference to a program diagram stored beforehand in the memory 110. Then, in step S303, the system control unit 116 performs AF control processing based on an image acquired by setting the exposure for the AF control.

Next, in step S304, the system control unit (i.e., the luminance setting unit) 116 performs luminance correction processing, corrects the real measurement luminance BvReal calculated in step S301, and sets (calculates) a correction luminance (i.e., a second luminance) BvCorrect. In the present exemplary embodiment, the real measurement luminance is photometry information about a subject obtained in each intermittent image capturing operation. On the other hand, the correction luminance is a control luminance to be used in the exposure control performed in each intermittent image capturing operation. More specifically, in the time-lapse mode, the camera 100 sets the exposure to be used in acquiring the image for recording based on the control luminance (i.e., the correction luminance) BvCorrect. In the present exemplary embodiment, by performing the luminance correction processing, the camera 100 can suppress the occurrence of unnatural flickering in the time-lapse moving image generated from the images acquired through intermittent image capturing operations. The luminance correction processing will be described in detail below.

Next, in step S305, the exposure control unit 115 sets an exposure to be used in a regular image capturing operation for acquiring a recording image (i.e., an image for recording) to be used in the generation of the time-lapse moving image, based on a correction luminance BvCorrect having been set. Next, in step S306, the system control unit 116 controls the sensor 105 to perform the regular image capturing operation and acquires the recording image.

The system control unit 116 controls the timing for performing the regular image capturing operation based on the image capturing interval having been set beforehand by the user. Further, in response to the completion of the regular image capturing operation, the system control unit 116 resets image capturing interval related time measurement that can be performed by a timer (not illustrated) provided in the system control unit 116. The timer is, for example, a real-time clock that can accurately measure the image capturing interval and the total image capturing time in the time-lapse mode.

Next, in step S307, the system control unit 116 controls the image processing unit 107 and the encoder unit 108 to perform development processing and coding processing on the acquired recording image, and generates an image data file.

Next, in step S308, the system control unit 116 reads the total image capturing time having been set beforehand and determines whether the image-capturing time up to the present has reached the total image capturing time. If the system control unit 116 determines that the image-capturing time up to the present has not yet reached the total image capturing time (NO in step S308), the operation returns to step S301. Then, while confirming that the image capturing interval related measurement by the timer has reached the next image capturing timing, the system control unit 116 starts processing for acquiring the next recording image.

Further, if the system control unit 116 determines that the image-capturing time up to the present has reached the total image capturing time (YES in step S308), the operation proceeds to step S309. Then, in step S309, the system control unit 116 generates moving image data by sequentially connecting the acquired recording images and stores the generated moving image data in the memory 110. If the recording completes, the system control unit 116 terminates the above-mentioned sequential image capturing processing. The recording control unit 109 can be configured to record the acquired moving image data to an external apparatus or an external memory via the external I/F unit 117. The camera 100 according to the present exemplary embodiment can perform the above-mentioned image capturing processing in the time-lapse mode.

(Luminance Correction Processing)

Figure 4:
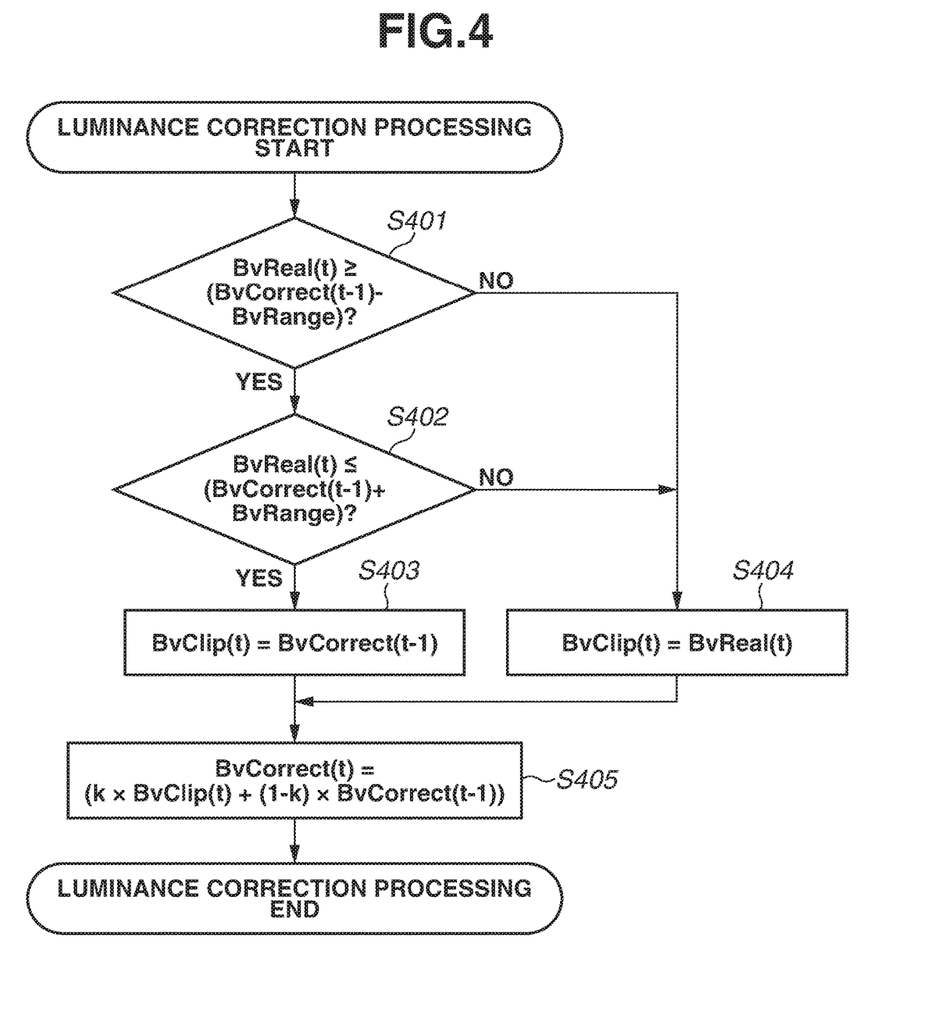
FIG. 4 is a flowchart illustrating luminance correction processing according to an exemplary embodiment.

Hereinafter, the luminance correction processing in the time-lapse mode, which can be performed by the camera 100 according to the present exemplary embodiment, will be described in detail below with reference to FIG. 4. FIG. 4 is a flowchart illustrating an example of the luminance correction processing according to an exemplary embodiment. In FIG. 4, a character "t" represents t-th luminance correction processing in the time-lapse mode, in which an initial value of t is 1. Accordingly, BvReal(t) represents a real measurement luminance corresponding to a t-th regular image capturing operation in the intermittent image capturing operation.

As illustrated in FIG. 4, if the camera 100 starts the luminance correction processing, then in steps S401 and S402, the system control unit 116 determines whether the real measurement luminance acquired in response to the t-th image capturing operation is included in a predetermined range based on, as a reference point, the correction luminance used in the (t−1)th regular image capturing operation. For example, in a case where the camera 100 sequentially performs first and second image capturing operations, the system control unit 116 determines whether the real measurement luminance acquired in response to the second image capturing operation is included in a predetermined range based on, as a reference point, the correction luminance relating to the first image capturing operation (i.e., the previous image capturing operation).

The above-mentioned predetermined range is a predetermined range relating to the luminance, which can be set by the system control unit 116 based on information recorded beforehand in the memory 110. In the following description, the predetermined range is BvCorrect(t−1)±BvRange, a reference point which is a correction luminance BvCorrect(t−1) used in the (t−1)th regular image capturing operation, as described in detail below. In this case, the reference point of the predetermined range is the central point as apparent from the expression "BvCorrect(t−1)±BvRange". However, the predetermined range can be any other range including at least BvCorrect(t−1).

The above-mentioned processing to be performed in the steps S401 and S402 will be described in detail below. In step S401, the system control unit 116 determines whether the real measurement luminance BvReal(t) acquired in the t-th image capturing operation satisfies the following formula (1) that defines a first condition.

$$\text{BvReal}(t) \geq (\text{BvCorrect}(t-1) - \text{BvRange}) \quad (1)$$

Further, in step S402, the system control unit 116 determines whether the real measurement luminance BvReal(t) satisfies the following formula (2) that defines a second condition.

$$\text{BvReal}(t) \geq (\text{BvCorrect}(t-1) + \text{BvRange}) \quad (2)$$

In the above-mentioned formulae (1) and (2), the value BvRange is comparable to 0.15 Bv in APEX value. More specifically, the size of the predetermined range is comparable to 0.30 Bv.

If the first and second conditions defined by the formulae (1) and (2) are satisfied (YES in steps S401 and S402), it can be concluded that the real measurement luminance acquired in response to the t-th image capturing operation is in the predetermined range including the correction luminance used in the (t−1)th regular image capturing operation (i.e., the reference point). In other words, if at least one of the first and second conditions defined by the formulae (1) and (2) is not satisfied, it can be concluded that the real measurement luminance acquired in response to the t-th image capturing operation is not in the predetermined range based on the correction luminance used in the (t−1)th regular image capturing operation.

If it is determined that the real measurement luminance acquired in response to the t-th image capturing operation is in the predetermined range (Yes in steps S401 and S402), then in step S403, the system control unit 116 sets the correction luminance BvCorrect(t−1) as a clip luminance (i.e., third luminance)BvClip(t). The clip luminance BvClip is a setting luminance to be set when clip processing is performed. In the present exemplary embodiment, the system control unit 116 sets a correction luminance BvCorrect (t) for the next image capturing operation (for recording) in the time-lapse mode based on a calculation result obtainable by mixing the clip luminance BvClip(t) and the correction luminance BvCorrect(t−1) at a predetermined rate, as described in detail below.

Further, if it is determined that the real measurement luminance acquired in response to the t-th image capturing operation is not in the predetermined range (No in step s401 or step S402), then in step S404, the system control unit 116 sets the real measurement luminance BvReal(t) as the clip luminance (i.e., third luminance) BvClip(t). In the present exemplary embodiment, the above-mentioned processing in steps S403 and S404 is referred to as clip processing (first processing). The clip luminance having been set in the above-mentioned clip processing is applied to cyclic-type filter processing (second processing) described below.

Next, in step S405, the system control unit 116 acquires (calculates) the correction luminance BvCorrect(t) to be used in the t-th regular image capturing operation by mixing the clip luminance acquired in the t-th image capturing operation and the correction luminance used in the (t−1)th regular image capturing operation at a predetermined rate.

The above-mentioned processing to be performed in step S405 will be described in detail below. In step S405, the system control unit 116 multiplies a coefficient "k" by the clip luminance BvClip(t) and multiplies another coefficient "(1−k)" by the correction luminance BvCorrect(t−1). Then, the system control unit 116 adds the multiplied values to obtain the correction luminance BvCorrect(t) to be used in the t-th regular image capturing operation ((0≤k≤1). The following formula (3) summarizes the above-mentioned processing.

$$\text{BvCorrect}(t) = (k \cdot \text{BvClip}(t) + (1-k) \cdot \text{BvCorrect}(t-1)) \quad (3)$$

In the present exemplary embodiment, the above-mentioned calculation processing in step S405 is referred to as cyclic-type filter processing (i.e., second processing). In the present exemplary embodiment, it is assumed that the above-mentioned coefficient k is 0.2.

If the cyclic-type filter processing completes and the correction luminance (i.e., second luminance) BvCorrect(t) to be used in the t-th regular image capturing operation is set, the system control unit 116 terminates the (t-th) luminance correction processing according to the present image capturing operation. As exceptional processing, the system control unit 116 can set the correction luminance BvCorrect (t) as the real measurement luminance BvReal(t) in the initial (t=1) image capturing operation when intermittent image capturing operations are performed in the time-lapse mode. The camera 100 can perform the above-mentioned luminance correction processing according to the present exemplary embodiment.

Figure 5:
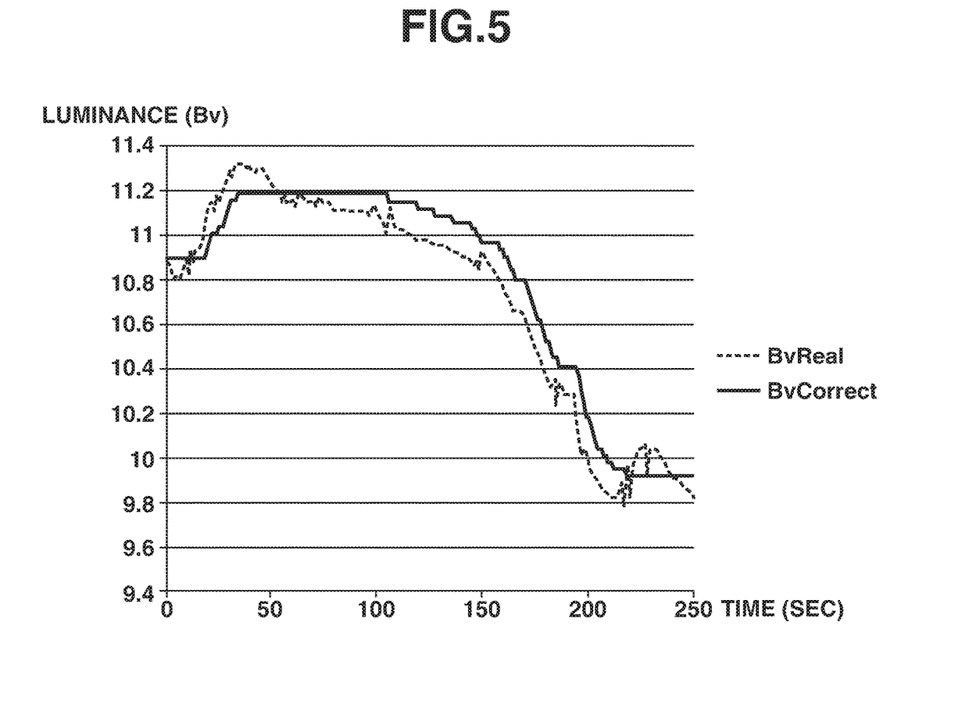
FIG. 5 illustrates an exemplary luminance variation that can be observed when the luminance correction processing according to the exemplary embodiment is applied.

An exemplary luminance variation that can be observed when the above-mentioned luminance correction processing is applied will be described in detail below with reference to FIGS. 5 and 6. FIG. 5 illustrates an exemplary luminance variation in a case where the luminance correction processing is applied according to an exemplary embodiment.

When the camera performs interval photographing for a time-lapse moving image, if the brightness of a subject does not change so much between intermittent image capturing operations, it may be desired to hold the same exposure between the image capturing operations. Such an exemplary case will be described in detail below with reference to FIG. 6. FIG. 6 illustrates an example of the temporal transition of luminance BvReal, which can be observed when the camera performs intermittent image capturing operations in a photographing scene that temporally changes from evening to night. The luminance BvReal is a photometry result acquired by performing photometry on the entire subject. Further, in FIG. 6, the vertical axis represents the real measurement luminance BvReal expressed in terms of APEX value and the horizontal axis represents the elapsed time (sec).

Figure 6:
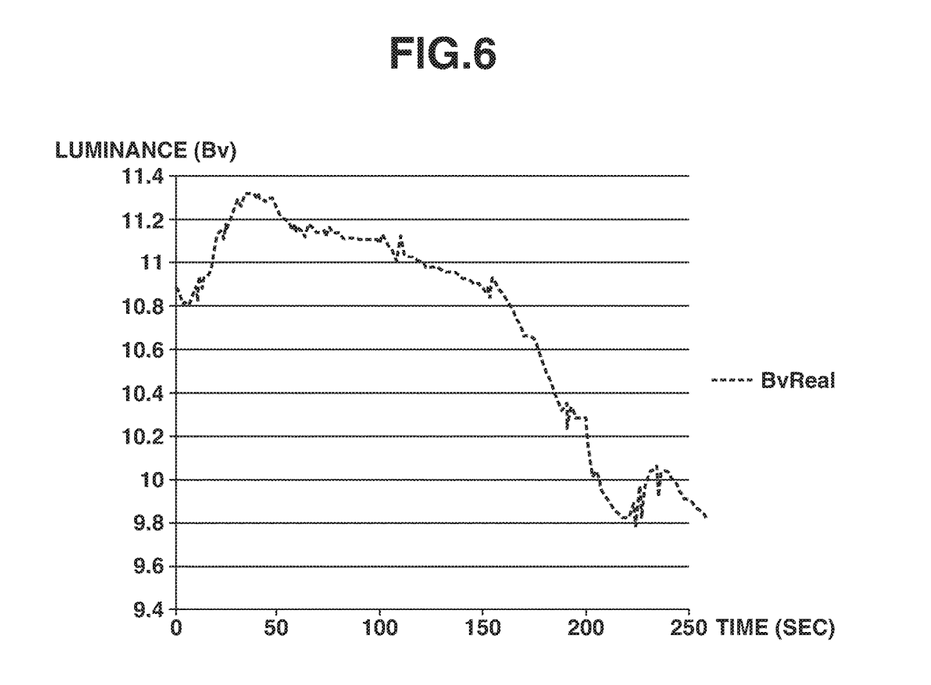
FIG. 6 illustrates an example of temporal transition of luminance, which can be observed when intermittent image capturing operations are performed in a photographing scene that temporally changes from evening to night.

As illustrated in FIG. 6, if the camera changes the exposure in response to a small variation of the real measurement luminance BvReal in each intermittent image capturing operation, the brightness of each subject (imaging target) will change finely between two continuously acquired images. For example, the brightness of the entire subject gradually decreases when the time elapses from evening to night. Further, apart from the above-mentioned temporal change of the ambient light, if the brightness fluctuates irregularly due to the influence of a light source included within the image (e.g., blinking of a street lamp), the luminance BvReal of the entire subject fluctuates correspondingly. If the camera changes the exposure in response to a small variation of the luminance BvReal in each intermittent image capturing operation, the brightness of each subject will change finely between acquired images. Accordingly, a time-lapse moving image obtained by connecting the above-mentioned images will include unnatural flickering occurring due to a change of the brightness of each subject. Therefore, a user will feel uncomfortable when viewing the time-lapse moving image. More specifically, if the brightness of an subject does not change so much between intermittent image capturing operations, it is desired to prevent the exposure from being changed unnecessarily between image capturing operations.

On the other hand, when the camera performs the above-mentioned luminance correction processing, the correction luminance BvCorrect(t) becomes equal to the correction luminance BvCorrect(t−1) if the clip luminance BvClip(t) becomes equal to the correction luminance BvCorrect(t−1). Further, if the clip luminance BvClip(t) is different from the correction luminance BvCorrect(t−1), the correction luminance BvCorrect(t) changes according to a variation of the real measurement luminance BvReal(t).

More specifically, in a case where the clip luminance having been set in the t-th luminance correction processing is equal to the correction luminance used in the (t−1)th regular image capturing operation, the cyclic-type filter processing applies the same luminance value to the t-th and (t−1)th regular image capturing operations. Further, in a case where the clip luminance having been set in the t-th luminance correction processing is different from the correction luminance used in the (t−1)th regular image capturing operation, the cyclic-type filter processing applies different luminance values to the t-th and (t−1)th regular image capturing operations. Further, in this case, the camera sets a luminance to be used in the t-th regular image capturing operation based on the luminance used in the (t−1)th regular image capturing operation and the t-th real measurement luminance. Therefore, it is feasible to prevent the change of the exposure between the (t−1)th and t-th regular image capturing operations from exceeding a predetermined amount.

FIG. 5 illustrates an exemplary transition of the correction luminance BvCorrect acquired according to the above-mentioned configuration. In the drawing, even when the real measurement luminance BvReal causes a smaller variation as indicated by a dotted line, the correction luminance BvCorrect does not change so rapidly as indicated by a solid line. More specifically, if the real measurement luminance BvReal causes a smaller variation, the correction luminance BvCorrect remains constant. If the real measurement luminance BvReal causes a larger variation, the correction luminance BvCorrect can change (or shift) moderately according to a luminance change of the subject.

Further, the camera 100 according to the present exemplary embodiment sets the clip luminance BvClip(t) (i.e., third luminance) by performing the clip processing (i.e., the first processing) based on the real measurement luminance (i.e., the first luminance) BvReal(t). Then, the camera 100 performs the cyclic-type filter processing (i.e., the second processing) based on the clip luminance BvClip(t) and the correction luminance (i.e., the second luminance) BvCorrect(t−1) used in the previous image capturing operation. In other words, the camera 100 is configured to perform the cyclic-type filter processing after completing the clip processing.

According to the above-mentioned configuration, when the real measurement luminance is in the predetermined range "BvCorrect(t−1)±BvRange", the brightness of the correction luminance is constantly held at the same level. In other words, when the real measurement luminance is in the predetermined range "BvCorrect(t−1)±BvRange", it is feasible to constantly hold the position of the predetermined range. Accordingly, for example, even when the camera 100 performs a plurality of continuous image capturing operations in the time-lapse mode, it is feasible to constantly hold the same exposure as long as the difference in the photometry result (i.e., the real measurement luminance) between respective image capturing operations is in the predetermined range "BvCorrect(t−1)±BvRange".

Further, even in a case where the real measurement luminance is not included in the predetermined range, the camera 100 can set the correction luminance to be used in the next image capturing operation based on a calculation result obtainable from the real measurement luminance and the correction luminance used in the previous image capturing operation. Accordingly, the camera 100 can change the exposure in such a manner that the brightness of a subject changes smoothly between intermittent image capturing operations.

As mentioned above, in the time-lapse mode, the camera 100 according to the present exemplary embodiment can change the exposure moderately if the ambient light changes greatly with the elapsed time (namely, in response to a larger luminance variation) while removing the adverse influence of a smaller luminance variation. Accordingly, the camera 100 according to the present exemplary embodiment can effectively suppress the flickering occurring in a moving image obtainable by connecting a plurality of images acquired through intermittent image capturing operations no matter how great or slight the brightness of a subject changes.

The above-mentioned exemplary embodiment is not seen to be limiting. The exemplary embodiment can be changed or modified in various ways within the scope of the invention. For example, in the above-mentioned exemplary embodiment, the camera 100 is configured to internally generate a time-lapse moving image in the time-lapse mode. However, the configuration of the camera 100 is not limited to the above-mentioned example. More specifically, the camera 100 can be configured to perform intermittent image capturing operations (i.e., interval photographing) to acquire recording images to be used for the generation of a time-lapse moving image and cause an external device or a computer network system to generate the time-lapse moving image.

Further, in the above-mentioned exemplary embodiment, the value BvRange used in the luminance correction processing is set to 0.15 Bv. However, the setting of the value BvRange is not limited to the above-mentioned example. For example, if it is desired to set a constant exposure value even when the luminance variation is relatively large, it will be useful to set a value larger than the above-mentioned BvRange. On the other hand, if it is desired to set a constant exposure value only when the luminance variation is relatively small, it will be useful to set a value smaller than the above-mentioned BvRange. More specifically, the predetermined range can be set arbitrarily.

As another example, it may be useful to set the above-mentioned predetermined range according to each photographing scene. For example, it is desired to set a relatively narrow range if the luminance changes greatly in the photographing scene (e.g., a sunset scene or a sunrise scene), namely, when the luminance changes stepwise. On the other hand, it is desired to set a relatively wide range if the luminance changes slightly in the photographing scene (e.g., a starry scene or a night view scene). In this case, the value BvRange in the second range is set to be larger than that in the first range.

The system control unit 116, which serves as a scene determination unit, can be configured to determine the photographing scene with reference to the real measurement luminance and color based on the obtained image as well as subject detection result. More specifically, the system control unit 116 can be configured to set the predetermined range based on a photographing scene determination result.

In this case, the system control unit 116 can be configured to perform subject detection processing with reference to the area and the position occupied by a subject and information about the distance between the camera 100 and the subject. For example, the system control unit 116 detects a subject occupying a larger area in an image, a subject positioned at substantially the center of an image, or a subject positioned adjacent to the camera 100, as a main subject. Then, the system control unit 116 determines the photographing scene based on the detected main subject, the luminance and (or) the color information.

Further, in the above-mentioned exemplary embodiment, the value BvRange used in the luminance correction processing is set to 0.15 Bv and the coefficient k is set to 0.2 ($0 \leq k \leq 1$). However, the setting of the coefficient k is not limited to the above-mentioned example. For example, if a moderate follow-up of the exposure is desired when the luminance of a subject changes between intermittent image capturing operations, it will be useful to set the coefficient k to be a relatively small value. On the other hand, if a prompt follow-up of the exposure is desired, it will be useful to set the coefficient k to be a relatively large value.

More specifically, in a case where the image capturing interval between intermittent image capturing operations is relatively short, there will be a smaller possibility that the ambient light greatly changes between continuous image capturing operations. Therefore, even if the coefficient k is set to be a larger value, the brightness will not change unnaturally between acquired images. In this case, it is feasible to set an appropriate correction luminance in response to a luminance change of the subject by setting a weighting degree applied to the present luminance to be greater than a weighting degree applied to the past luminance in the cyclic-type filter processing. On the other hand, in a case where the image capturing interval between intermittent image capturing operations is relatively long, there will be a higher possibility that the ambient light greatly changes between continuous image capturing operations. Therefore, if the coefficient k is large, the brightness may change unnaturally between acquired images. In this case, it is feasible to set an appropriate correction luminance in response to a luminance change of the subject by setting the weighting degree applied to the present luminance to be smaller than the weighting degree applied to the past luminance in the cyclic-type filter processing.

In view of the above, it may be useful to change the coefficient k of the cyclic-type filter processing according to the image capturing interval between intermittent image capturing operations. More specifically, the system control unit 116 sets a greater coefficient k for a second image capturing interval (i.e., a shorter image capturing interval), compared to that for a first image capturing interval (i.e., a longer image capturing interval). More specifically, the system control unit 116 sets a greater weighting degree applied to the real measurement luminance for the second image capturing interval, compared to that for the first image capturing interval. An imaging apparatus employing the above-mentioned configuration can perform effective exposure control processing according to the photographing scene or the image capturing interval.

Further, in the above-mentioned exemplary embodiment, the system control unit 116 calculates the correction luminance BvCorrect(t) according to the formula (3) if the conditions defined by the formulae (1) and (2) are satisfied (YES in both determinations of steps S401 and S402). However, the above-mentioned example is not seen to be limiting. For example, when the real measurement luminance BvReal(t) is in the predetermined range BvCorrect(t−1)±BvRange, the system control unit 116 can be configured to set, as BvCorrect(t), a luminance value capable of realizing the brightness substantially the same as BvCorrect(t−1). In this case, it is assumed that both luminance values are substantially the same if the luminance difference between BvCorrect(t−1) and BvCorrect(t) is equal to or less than predetermined value (for example 0.1 Bv in APEX value).

Further, in the above-mentioned exemplary embodiment, even when the conditions defined by the formulae (1) and (2) are satisfied (YES in both determinations of steps S401 and S402), the system control unit 116 calculates the clip luminance and the correction luminance. However, the above-mentioned example is not seen to be limiting. For example, the system control unit 116 can be configured to hold the same exposure having been set in the previous (i.e., (t−1)th) regular image capturing operation if the real measurement luminance BvReal(t) is in the predetermined range BvCorrect(t−1)±BvRange. More specifically, the system control unit 116 can be configured to omit the processing in steps S403 and S405 if the conditions defined by the formulae (1) and (2) are satisfied (YES in both determinations of steps S401 and S402).

Further, in the above-mentioned exemplary embodiment, the predetermined range employed in the luminance correction processing relates to the luminance. However, the above-mentioned example is not seen to be limiting. For example, the predetermined range employed in the luminance correction processing can be a range including, as a reference point, the exposure used in the (t−1)th regular image capturing operation. In this case, the system control unit 116 can be configured to determine whether an exposure corresponding to a luminance acquired by performing photometry on a subject is included in the above-mentioned predetermined range.

Further, in the above-mentioned exemplary embodiment, the recording control unit 109, the memory 110, the drive control unit 114, the exposure control unit 115, and the system control unit 116 cooperate with each other to control the operations of the camera 100. However, the above-mentioned example is not seen to be limiting. For example, the above-mentioned operations and controls of the camera 100 can be realized by storing computer programs capable of realizing the above-mentioned flowcharts illustrated in FIGS. 3 and 4 beforehand in the memory 110 and causing the system control unit 116 to execute the computer programs.

Further, the above-mentioned programs can be replaced by object codes, programs executed by an interpreter, or script data supplied to the OS if functions thereof are comparable to the above-mentioned programs. Further, the recording medium supplying the programs can be a hard disk, a magnetic recording medium (e.g., a magnetic tape), or an optical/magneto-optical recording medium.

Further, in the above-mentioned exemplary embodiment, an example of the imaging apparatus is the digital camera. However, the above-mentioned example is not seen to be limiting. For example, while the above-described embodiments have been applied to a camera, other embodiments may apply to other devices. For example, a portable device (e.g., a digital video camera or a smartphone), a security camera, or an imaging apparatus other than the digital camera, etc.

(Other Exemplary Embodiment)

Further, various embodiments can be realized by supplying a program capable of realizing at least one of the functions of the above-mentioned exemplary embodiments to a system or an apparatus via a network or an appropriate storage medium and causing at least one processor of a computer provided in the system or the apparatus to read the program and perform processing. Further, various embodiments can be realized by a circuit (e.g., ASIC) capable of realizing at least one of the functions.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosed exemplary embodiments are not seen to be limiting. The scope of the following claims is to be accorded the broadest interpretation so as to encompass all such modifications and equivalent structures and functions.

This application claims the benefit of Japanese Patent Application No. 2016-012870, filed Jan. 26, 2016, which is hereby incorporated by reference herein in its entirety.

What is claimed is:

1. An imaging apparatus capable of setting an interval shooting mode for causing an imaging device to perform intermittent image capturing operations to acquire a moving image constituted by a plurality of images sequentially acquired through the intermittent image capturing operations, the imaging apparatus comprising:
one or more processors; and
one or more memories storing instructions that, when executed by the one or more processors, cause the imaging apparatus to perform operations comprising:
acquiring a real measurement luminance by performing photometry on a subject;
performing exposure control processing; and
setting a control luminance to be used when the exposure control processing is performed in an image capturing operation,
wherein in the interval shooting mode, if a real measurement luminance acquired in response to a second image capturing operation to be performed after a first image capturing operation is in a predetermined range based on, as a reference point, a control luminance used in the first image capturing operation, the setting sets a control luminance to be used in the second image capturing operation to be substantially the same as the control luminance used in the first image capturing operation,
wherein if the real measurement luminance acquired in response to the second image capturing operation is not in the predetermined range, the setting sets the control luminance to be used in the second image capturing operation based on a calculation result obtainable by using the real measurement luminance acquired in response to the second image capturing operation and the control luminance used in the first image capturing operation, and
wherein the intermittent image capturing operations in the interval shooting mode include the first image capturing operation and the second image capturing operation.

2. The imaging apparatus according to claim 1, wherein the setting sets the control luminance to be used in the second image capturing operation by mixing a setting luminance having been set by performing first processing based on the real measurement luminance acquired by the acquiring in response to the second image capturing operation, in the interval shooting mode, and the control luminance used in the first image capturing operation, at a predetermined rate.

3. The imaging apparatus according to claim 2, wherein if the real measurement luminance acquired in response to the second image capturing operation is in the predetermined range based on, as the reference point, the control luminance used in the first image capturing operation, the first processing sets the control luminance used in the first image capturing operation as the setting luminance, and if the real measurement luminance acquired in response to the second image capturing operation is not in the predetermined range based on, as the reference point, the control luminance used in the first image capturing operation, the first processing sets the real measurement luminance acquired in response to the second image capturing operation as the setting luminance.

4. The imaging apparatus according to claim 3, wherein the setting changes the predetermined rate according to an image capturing interval between intermittent image capturing operations in the interval shooting mode.

5. The imaging apparatus according to claim 4, wherein in determining the predetermined rate, a relatively smaller weighting degree is applied to the real measurement luminance when the image capturing interval is a first image capturing interval and a relatively greater weighting degree is applied to the real measurement luminance when the image capturing interval is a second image capturing interval, which is shorter than the first image capturing interval.

6. The imaging apparatus according to claim 1, wherein the operations further comprise:
determining a scene in an image capturing operation,
wherein the setting sets the predetermined range based on a determination result obtained by the determining, in the interval shooting mode.

7. The imaging apparatus according to claim 6, wherein in the interval shooting mode, the predetermined range is relatively narrower when the determining determines that the scene includes a larger number of luminance changes occurring between intermittent image capturing operations and the predetermined range is relatively wider when the determining determines that the scene includes a smaller number of luminance changes occurring between intermittent image capturing operations.

8. The imaging apparatus according to claim 6, wherein the determining determines the scene in the image capturing operation based on at least one of information acquirable from an acquired image, such as luminance, color, and subject detection result and information about a distance between the imaging apparatus and the subject.

9. The imaging apparatus according to claim 6, wherein the setting sets a first luminance acquired by the acquiring as a second luminance in an initial image capturing operation when the imaging apparatus performs intermittent image capturing operations in the interval shooting mode.

10. The imaging apparatus according to claim 1, wherein the acquiring acquires a first luminance in response to the second image capturing operation in an image capturing interval between the first image capturing operation and the second image capturing operation, at timing adjacent to the second image capturing operation than a midpoint of the image capturing interval, in the interval shooting mode.

11. The imaging apparatus according to claim 1, wherein exposure control processing is performed for each intermittent image capturing operation in the interval shooting mode.

12. The imaging apparatus according to claim 1, wherein the acquiring acquires a first luminance based on the luminance of each block when the acquired image is divided into a plurality of blocks.

13. An imaging apparatus capable of setting an interval shooting mode for causing an imaging device to perform intermittent image capturing operations to acquire a moving image constituted by a plurality of images sequentially acquired through the intermittent image capturing operations, the imaging apparatus comprising:

one or more processors; and
one or more memories storing instructions that, when executed by the one or more processors, cause the imaging apparatus to perform operations comprising:
acquiring a real measurement luminance by performing photometry on an subject;
performing exposure control processing;
setting a setting luminance by causing the acquiring to perform first processing based on a real measurement luminance acquired in response to a second image capturing operation to be performed after a first image capturing operation, in the interval shooting mode; and
calculating a control luminance to be used when exposure control processing is performed in an image capturing operation,
wherein the calculating calculates the control luminance to be used in the second image capturing operation by performing second processing for mixing the setting luminance having been set by performing the first processing and the control luminance used in the first image capturing operation, at a predetermined rate, and
wherein in the interval shooting mode, the first processing includes determining whether the real measurement luminance acquired in response to the second image capturing operation is in a predetermined range based on, as a reference point, the control luminance used in the first image capturing operation, and setting the setting luminance based on the determination result.

14. The imaging apparatus according to claim 13, wherein in the interval shooting mode, if the real measurement luminance acquired in response to the second image capturing operation is in the predetermined range based on, as the reference point, the control luminance used in the first image capturing operation, the first processing sets the control luminance used in the first image capturing operation as the setting luminance to be used in the second image capturing operation and if the real measurement luminance acquired in response to the second image capturing operation is not in the predetermined range based on, as the reference point, the control luminance used in the first image capturing operation, the first processing sets the real measurement luminance acquired in response to the second image capturing operation as the setting luminance to be used in the second image capturing operation.

15. The imaging apparatus according to claim 13, wherein in determining the predetermined rate, a relatively smaller weighting degree is applied to the setting luminance when the image capturing interval is a first image capturing interval and a relatively larger weighting degree is applied to the setting luminance when image capturing interval is a second image capturing interval, which is shorter than the first image capturing interval.

16. A method for controlling an imaging apparatus capable of setting an interval shooting mode for causing an imaging device to perform intermittent image capturing operations to acquire a moving image constituted by a plurality of images sequentially acquired through the intermittent image capturing operations, the method comprising:
acquiring a real measurement luminance by performing photometry on a subject;
performing exposure control processing; and
setting a control luminance to be used for exposure control processing in an image capturing operation,
wherein in the interval shooting mode, if a real measurement luminance acquired in response to a second image capturing operation to be performed after a first image capturing operation is in a predetermined range based on, as a reference point, a control luminance used in the first image capturing operation, a control luminance to be used in the second image capturing operation is set to be substantially the same as the control luminance used in the first image capturing operation, wherein if the real measurement luminance acquired in response to the second image capturing operation is not in the predetermined range, the control luminance to be used in the second image capturing operation is set based on a calculation result obtainable by using the real measurement luminance acquired in response to the second image capturing operation and the control luminance used in the first image capturing operation, and wherein the intermittent image capturing operations in the interval shooting mode include the first image capturing operation and the second image capturing operation.

17. A method for controlling an imaging apparatus capable of setting an interval shooting mode for causing an imaging device to perform intermittent image capturing operations to acquire a moving image constituted by a plurality of images sequentially acquired through the intermittent image capturing operations, the method comprising:

acquiring a real measurement luminance by performing photometry on a subject;

performing exposure control processing;

setting a setting luminance by performing first processing based on a real measurement luminance acquired in response to a second image capturing operation to be performed after a first image capturing operation, in the interval shooting mode, and calculating a control luminance to be used for exposure control processing in an image capturing operation, wherein the control luminance to be used in the second image capturing operation is calculated by performing second processing for mixing the setting luminance having been set by performing the first processing and the control luminance used in the first image capturing operation at a predetermined rate, and wherein in the interval shooting mode, the first processing includes determining whether the real measurement luminance acquired in response to the second image capturing operation is in a predetermined range based on, as a reference point, the control luminance used in the first image capturing operation, and setting the setting luminance based on the determination result.

18. A non-transitory computer readable storage medium storing a program for causing a computer to control an imaging apparatus capable of setting an interval shooting mode for causing an imaging apparatus to perform intermittent image capturing operations to acquire a moving image constituted by a plurality of images sequentially acquired through the intermittent image capturing operations, the program comprising:

computer-executable instructions for acquiring a real measurement luminance by performing photometry on a subject;

computer-executable instructions for performing exposure control processing; and computer-executable instructions for setting a control luminance to be used for exposure control processing in an image capturing operation, wherein in the interval shooting mode, if a real measurement luminance acquired in response to a second image capturing operation to be performed after a first image capturing operation is in a predetermined range based on, as a reference point, a control luminance used in the first image capturing operation, a control luminance to be used in the second image capturing operation is set to be substantially the same as the control luminance used in the first image capturing operation, wherein if the real measurement luminance acquired in response to the second image capturing operation is not in the predetermined range, the control luminance to be used in the second image capturing operation is set based on a calculation result obtainable by using the real measurement luminance acquired in response to the second image capturing operation and the control luminance used in the first image capturing operation, and wherein the intermittent image capturing operations in the interval shooting mode include the first image capturing operation and the second image capturing operation.

19. A non-transitory computer readable storage medium storing a program for causing a computer to control an imaging apparatus capable of setting an interval shooting mode for causing an imaging apparatus to perform intermittent image capturing operations to acquire a moving image constituted by a plurality of images sequentially acquired through the intermittent image capturing operations, the program comprising:

computer-executable instructions for acquiring a real measurement luminance by performing photometry on a subject;

computer-executable instructions for performing exposure control processing;

computer-executable instructions for setting a setting luminance by performing first processing based on a real measurement luminance acquired in response to a second image capturing operation to be performed after a first image capturing operation, in the interval shooting mode, and computer-executable instructions for calculating a control luminance to be used for exposure control processing in an image capturing operation, wherein the control luminance to be used in the second image capturing operation is calculated by performing second processing for mixing the setting luminance having been set by performing the first processing and the control luminance used in the first image capturing operation at a predetermined rate, wherein in the interval shooting mode, the first processing includes determining whether the real measurement luminance acquired in response to the second image capturing operation is in a predetermined range based on, as a reference point, the control luminance used in the first image capturing operation, and setting the setting luminance based on the determination result.

* * * * *